United States Patent
Arndt et al.

(10) Patent No.: US 11,229,930 B2
(45) Date of Patent: Jan. 25, 2022

(54) WASHING SYSTEM AND METHODS OF USE

(71) Applicant: Jeanneworks, Inc., Omaha, NE (US)

(72) Inventors: Mark S. Arndt, Omaha, NE (US);
Jeanne L. Caples, Omaha, NE (US)

(73) Assignee: JEANNEWORKS, INC., Omaha, NE (US)

( * ) Notice: Subject to any disclaimer, the term of this patent is extended or adjusted under 35 U.S.C. 154(b) by 292 days.

(21) Appl. No.: 15/046,829

(22) Filed: Feb. 18, 2016

(65) Prior Publication Data

US 2017/0239691 A1    Aug. 24, 2017

(51) Int. Cl.
| B08B 3/02 | (2006.01) |
| B08B 17/02 | (2006.01) |
| B60S 3/04 | (2006.01) |
| B08B 3/00 | (2006.01) |

(52) U.S. Cl.
CPC .............. *B08B 3/026* (2013.01); *B08B 3/006* (2013.01); *B08B 17/025* (2013.01); *B60S 3/041* (2013.01)

(58) Field of Classification Search
CPC ....... B08B 3/026; B08B 3/006; B08B 17/025; B60S 3/041
See application file for complete search history.

(56) References Cited

U.S. PATENT DOCUMENTS

| 4,316,433 A | 2/1982 | Hebert et al. |
| 4,505,229 A | 3/1985 | Altissimo et al. |
| 4,836,144 A | 6/1989 | Cole et al. |
| 5,148,771 A | 9/1992 | Schuett et al. |
| 5,193,487 A | 3/1993 | Vogel et al. |
| 5,213,064 A | 5/1993 | Mondine et al. |
| 5,249,930 A | 10/1993 | Pacquesi et al. |
| 5,259,339 A | 11/1993 | McLaughlin et al. |
| 5,441,707 A | 8/1995 | Lewis et al. |
| 5,711,252 A | 1/1998 | Brandolino et al. |
| 5,738,044 A | 4/1998 | Gaylinn et al. |
| 5,794,570 A | 8/1998 | Foster et al. |
| 5,842,442 A | 12/1998 | Marr et al. |
| 5,845,604 A | 12/1998 | Cucchi et al. |

(Continued)

FOREIGN PATENT DOCUMENTS

| CH | 679646 A5 * | 3/1992 | ............... B60S 3/041 |
| DE | 19824271 A * | 12/1999 | ............... B08B 3/02 |

(Continued)

*Primary Examiner* — Alexander Markoff
(74) *Attorney, Agent, or Firm* — Perkins Coie LLP

(57) ABSTRACT

A washing container for washing or maintaining various objects includes opposite side portions, end portions, and a bottom portion. Embodiments include at least one lower support having an engagement gap extending between lower support arms and configured to releasably secure the objects. Some embodiments include opposing lower supports that secure opposite ends of the objects. An upper support arm may be used independently or together with one or more lower supports to secure one or more objects, in various positions, within the washing container. A perforated support platform support the objects above the bottom portion of the washing container and allows fluids and debris to pass to the bottom portion and into a drain trough. A debris basket within the trough limits the passage of debris into a drain.

20 Claims, 7 Drawing Sheets

(56) References Cited

U.S. PATENT DOCUMENTS

| | | | | |
|---|---|---|---|---|
| 6,325,082 B1* | 12/2001 | Schlueter | ............... | B60S 3/041 134/116 |
| 7,080,608 B1* | 7/2006 | Arndt | .................. | A01K 13/001 119/665 |
| 8,220,417 B2 | 7/2012 | Arndt et al. | | |
| 2003/0146256 A1* | 8/2003 | Olsen, Jr. | ................ | B60P 3/073 224/311 |
| 2007/0138314 A1 | 6/2007 | Weemhoff et al. | | |
| 2008/0314419 A1* | 12/2008 | Galifi | .................... | B60S 3/041 134/36 |
| 2009/0217955 A1* | 9/2009 | Harrell | ..................... | B08B 3/02 134/56 R |
| 2010/0307531 A1* | 12/2010 | Aharonov | ............... | B60S 3/041 134/6 |
| 2011/0000745 A1* | 1/2011 | Good | ...................... | B62H 3/04 187/215 |
| 2013/0007978 A1* | 1/2013 | Gore | ...................... | B60S 3/041 15/268 |
| 2014/0041180 A1* | 2/2014 | Williams | ............... | F16M 11/20 29/402.01 |
| 2014/0284288 A1* | 9/2014 | Huntington | ............. | B62H 3/04 211/20 |
| 2015/0191129 A1* | 7/2015 | Hubacher | ................ | B60R 9/10 224/519 |
| 2016/0059830 A1* | 3/2016 | Serrurier | ................ | B60S 3/041 134/123 |

FOREIGN PATENT DOCUMENTS

| | | | | | |
|---|---|---|---|---|---|
| DE | 202016102020 | U1 | * | 6/2016 | ............. B08B 1/04 |
| EP | 0733528 | A2 | * | 9/1996 | ............. B08B 1/04 |
| EP | 0637531 | B1 | * | 11/1996 | ............. B60S 3/041 |
| EP | 2537720 | A1 | * | 12/2012 | ............. B60S 3/041 |
| FR | 2625070 | A1 | | 6/1989 | |
| FR | 2976539 | A1 | * | 12/2012 | ............. B60S 3/041 |
| GB | 2554386 | B | * | 4/2019 | ............. B62H 3/08 |
| WO | WO-2013004794 | A1 | * | 1/2013 | ............. B60S 3/041 |
| WO | WO-2017114763 | A1 | * | 7/2017 | ............. B08B 3/02 |

* cited by examiner

WASHING SYSTEM AND METHODS OF USE

BACKGROUND

Bicycles have greatly increased in popularity over the years. Innovation in the different classes of bicycles have led to a wide array of outdoor competitions and leisure riding by riders of all levels. From trail riding on mountain bikes, to winter riding on fat tire bikes, and road biking for miles, all bikes have at least one similarity when the rides are over; they are dirty. This is problematic on a number of levels. Many bike owners store their bikes inside their homes when garages and other secure storage locations are unavailable. Dirty bikes bring the dirt and debris inside with them, making living spaces dirty and increasing frustrations. Dirty bikes aren't well maintained bikes. Dirt and debris collects in gears, cabling, and other areas that respond poorly to the accumulation of abrasive dirt and debris. Moreover, modern bicycles are an investment for most bicycle owners. Most bicycle owners, therefore, want to maintain their bicycles in a clean and attractive condition.

There have been many different methods of washing bicycles. Most prior methods are fairly primitive. At one time or another many bicycle owners have simply leaned their dirty bicycle against a static structure near a garden hose and sprayed most of the dirt and debris from the bicycle. Sometimes, a bucket of soapy water may be used to get the bicycle a little cleaner. However, such methods are typically performed at ground level. This requires the user to bend, kneel, or sit on the ground to get to the lower areas of the bicycle. With the bicycle on the ground the user can't reach the portions of the tires that are resting on the ground without moving the bicycle back and forth, which is cumbersome and rolls clean portions of the tires along a dirty ground surface. Simply leaning the bicycle against a static structure is also less than desirable. With the bicycle resting on its tires it is allowed to roll forward or backward, or simply fall over, in response to the jet of water coming from the garden hose. The user is left with holding the bicycle with one hand while the other hand operates the garden hose. Such primitive methods of washing bicycles aren't even available to those who don't have a garden hose or an area to hose off the bicycle.

Prior methods of washing bicycles provide little regard for the environment in which the bicycle is washed. Bicycles are constructed from frame tubing, spaced apart spokes, and other narrow, spaced-apart structures. Accordingly, jets of water directed at the bicycle are not contained. Everything around the bicycle being washed also gets washed, which can be inconvenient at best and potentially damaging to certain surroundings. Even where damage does not occur, the dirt and debris is left behind in the washing area. If an individual is lucky enough to be able to wash a bicycle near a floor drain, continued washing of dirt and debris from bicycles can clog the floor drain.

Most prior methods of washing bicycles require the tires to be in contact with a ground surface. This fails to provide a convenient position in which the bicycle can be services while it is cleaned. Oftentimes it is desirable to be able to rotate the wheels to confirm that the spokes are true. It is also desirable to crank the bicycle through its gears so that small mechanical adjustments can be made. Basic maintenance is more easily and more accurately performed when the bicycle is positioned at or near eyelevel. Some prior methods of washing and maintaining bicycles may include hanging the bike by the handlebars or seat post. However, such methods of suspending the bicycle are typically unstable. The bicycle begins to rotate and/or swing like a pendulum as the jet of water hits the bicycle. Again, the user is forced to secure the bicycle with one hand while the other hand washes or maintains the bicycle. Suspension of the bicycle provides little benefit without a method of anchoring the bicycle's suspended position.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure provides various embodiments of a washing apparatus, having a washing container that is defined by opposite side portions, opposite end portions, and a bottom portion. Some embodiments of the washing apparatus include a supporting platform that is disposed within the washing container so that the platform is vertically spaced from the bottom portion of the washing container. Embodiments of the supporting platform incorporate one or more structures, such as drainage openings, to assist in the drainage of fluid from the upper surface off of the supporting platform during washing operations. Various embodiments of the washing apparatus include a trough positioned to extend lower than the bottom portion of the washing container such that washing liquid flows into the trough toward a drain. To limit the amount of dirt and other debris from entering the trough and potentially clogging the drain, a debris basket may be received within the trough.

In various embodiments, the washing apparatus may be used to wash and/or maintain various objects, such as bicycles of various sizes and configurations. A lower support may be provided to securely engage a bicycle wheel or tire. In such embodiments, the wheel or tire is received within an engagement gap between a first lower support arm and a second lower support arm. In various embodiments, a proximal end portion of the first lower support arm is movably coupled with a lower support base, such that it may be selectively positioned along a length of the lower support base. In some such embodiments, the proximal end portion includes a bracket that is shaped to removably receive a width of the lower support base 66. To allow incremental movement of the first lower support arm along a length of the lower support base, a plurality of positioning teeth extend outwardly from the lower support base, in a spaced-apart relationship with one another along a length of the lower support base. Spaces between the positioning teeth are generally sized to approximate a width of the bracket.

In some embodiments of the present technology the first lower support arm is configured to selectively move between open and closed positions with regard to the second lower support arm. In one such embodiment, the proximal end portion of the first lower support arm includes a hinge that is configured to allow the first lower support arm to pivot toward and away from the second lower support arm. The closed position places the first lower support arm and second lower support arm closely adjacent opposite sides of the object to be secured. In the embodiments of the open position, the first lower support arm is flipped up into a generally vertical orientation, which clears a path for loading and unloading objects, such as bicycle tires and wheels, into and from the engagement gap.

Embodiments of the washing apparatus include one or more upper supports, each having one or more upper support arms. The upper supports may be positioned to extend from one or more of the side portions or end portions. In some embodiments, the upper support is removably coupled to an upper edge portion of the washing container so that it may be selectively positioned along the washing container. In various embodiments, the upper support arm may be positioned at various heights with respect to the bottom portion of the washing container. An alternate support arm may be positioned at a distal end portion of the upper support arm that extends transversely to a length of the upper support arm. This configuration permits one or more support straps to depend from an end portion of the alternate support arm.

In a method of use, an object, such as a bicycle is placed within the washing container. A portion of the bicycle is secured within the engagement gap between the first lower support arm and the second lower support arm. In some embodiments, a second portion of the bicycle is secured within the second engagement gap between a first lower support arm and second lower support arm. In particular embodiments, the bicycle is secured within the engagement gap between the first lower support arm and the second lower support arm by moving the first lower support arm into an open position with respect to the second lower support arm. The wheel or tire of the bicycle may then be positioned within the engagement gap and the first lower support arm may be moved into its closed position with respect to the second lower support arm. In particular embodiments, the engagement gap is selectively narrowed or widened by moving the first lower support arm toward or away from the second lower support arm.

In some embodiments, a portion of the bicycle, such as an upper frame member or bicycle seat may be secured with an upper support arm of an upper support that is operatively coupled to and cantilevers outwardly from one of the opposite end portions and opposite side portions of the washing container, above the bottom portion. In various embodiments the bicycle is simultaneously securing by the upper support and the lower support. In particular embodiments, the upper support arm is selectively positioned at one of a plurality of different heights from the bottom portion of the washing container, prior to securing the bicycle with the upper support arm. In some embodiment, the bicycle is secured with the support strap that depends from the upper support arm.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Figure 1:
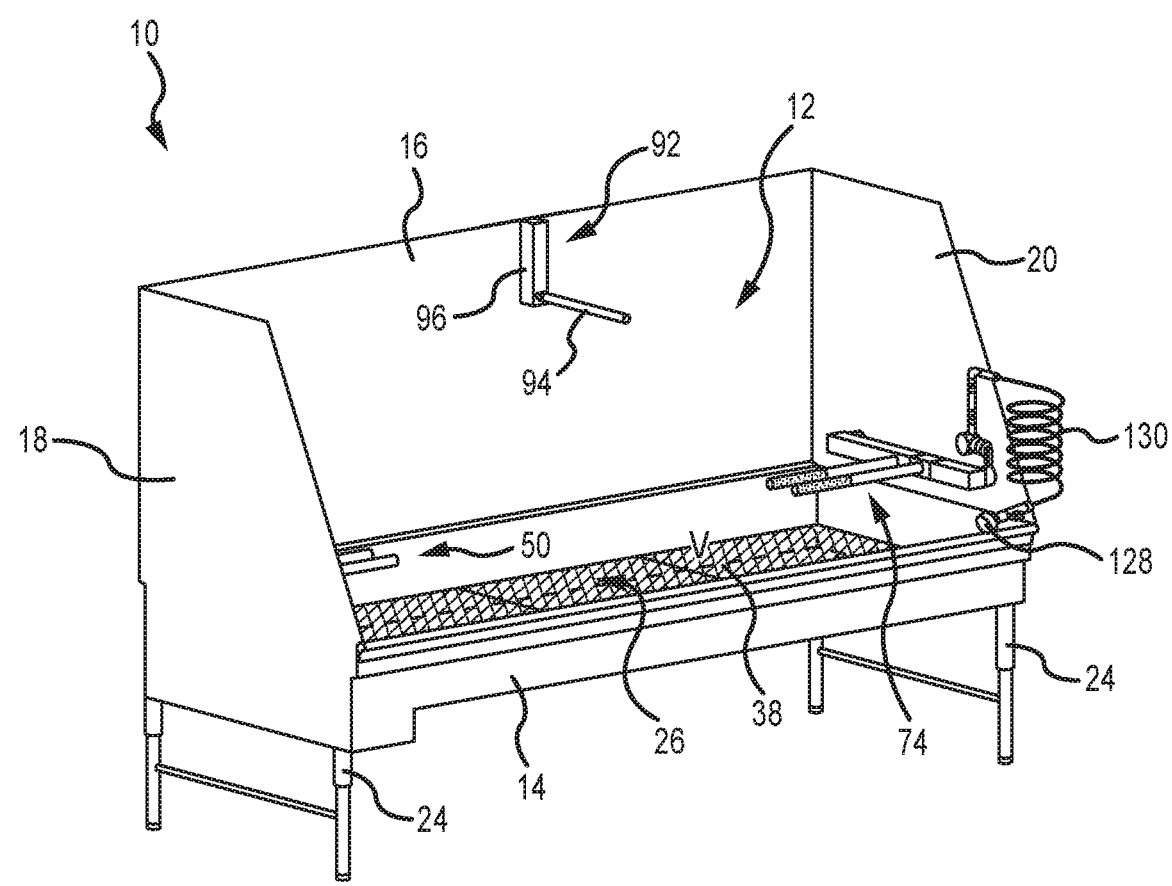
FIG. 1 depicts a perspective view of one embodiment of the washing apparatus of the present technology.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Embodiments of a washing apparatus 10 of the present technology are presented herein. The washing apparatus 10 is generally described herein as a system for washing and/or maintaining bicycles. However, it is contemplated that the present technology can be applied to the washing and/or maintaining a wide variety of objects without departing from the scope or general design of the washing apparatus 10. Accordingly, the present technology should not be construed as being limited to the washing and/or maintaining of bicycles alone.

With reference to FIGS. 1-12, embodiments of the washing apparatus 10 include a washing container 12 defined by opposite side portions 14 and 16, opposite end portions 18 and 20, and a bottom portion 22. In some embodiments, the washing container 12 includes one or more legs 24 of various possible configurations that depend downwardly from the washing tub 12 and support the washing tub 12 in an elevated position above a ground level. It is contemplated that the legs 24 could be provided in various lengths or length-adjustable to vary the height of the washing tub from the ground level. In other embodiments, one or more of the opposite side portions 14 and 16, and opposite end portions 18 and 20 are provided to extend below a level at which the bottom portion 22 resides in order to support the washing tub in an elevated position. Although the present invention is shown to have a generally rectangular shape, virtually any shape is contemplated to fit the particular needs and applications of the user, from square, to round, to an obround shape. In some embodiments it is contemplated that a roof portion (not depicted) may be positioned above the bottom portion 22 and operatively connected to one or more of the opposite side portions 14 and 16, and opposite end portions 18 and 20. In other embodiments, a ramp may extend from a side portion to a ground level. In some such embodiments, an opening or doorway may be formed in the side portion at a terminal end of the ramp.

Figure 2:
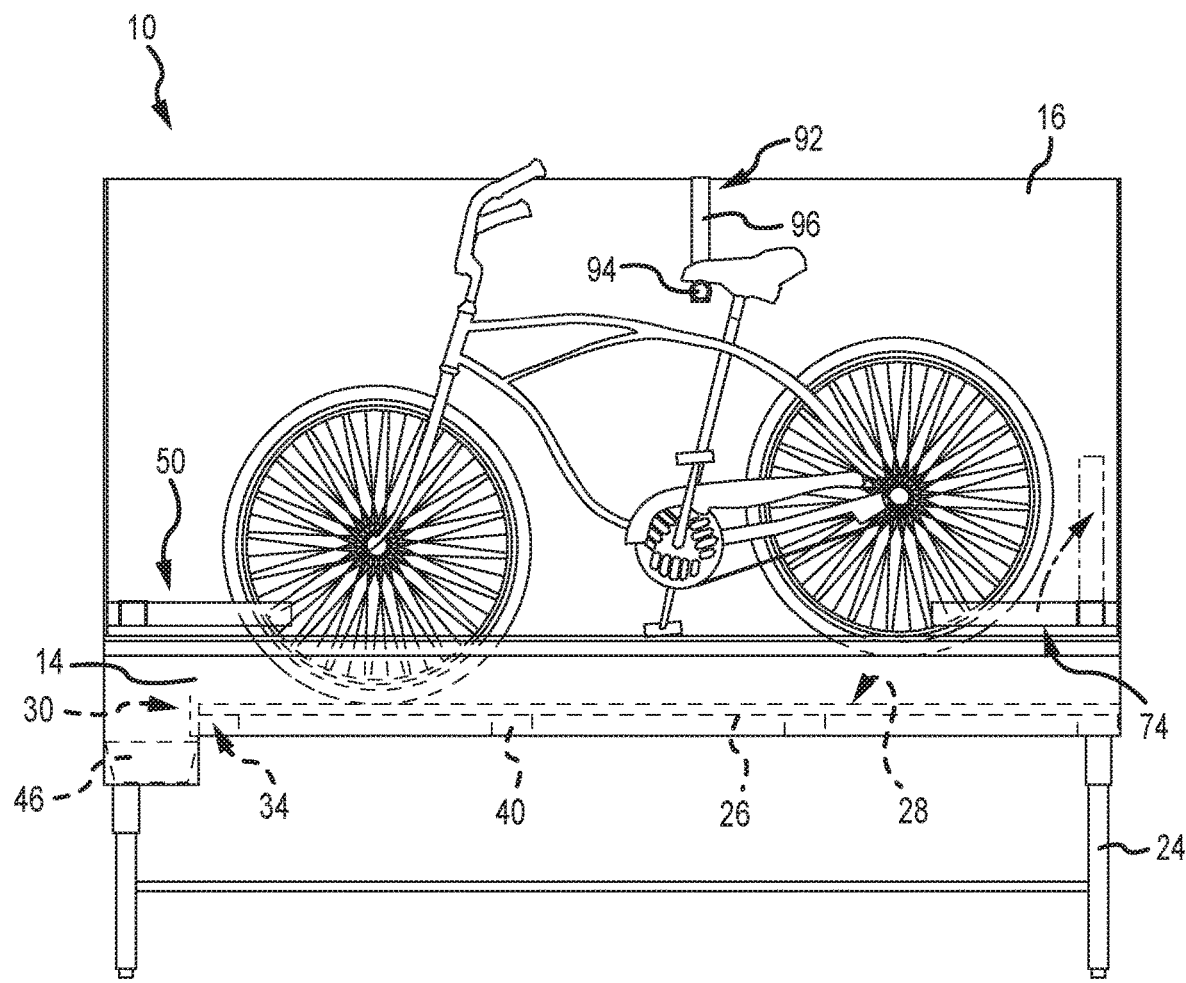
FIG. 2 depicts a front elevation view of an embodiment of the washing apparatus of the present technology and depicts one manner in which a bicycle may be secured within the washing apparatus for a washing operation.
Figure 3:
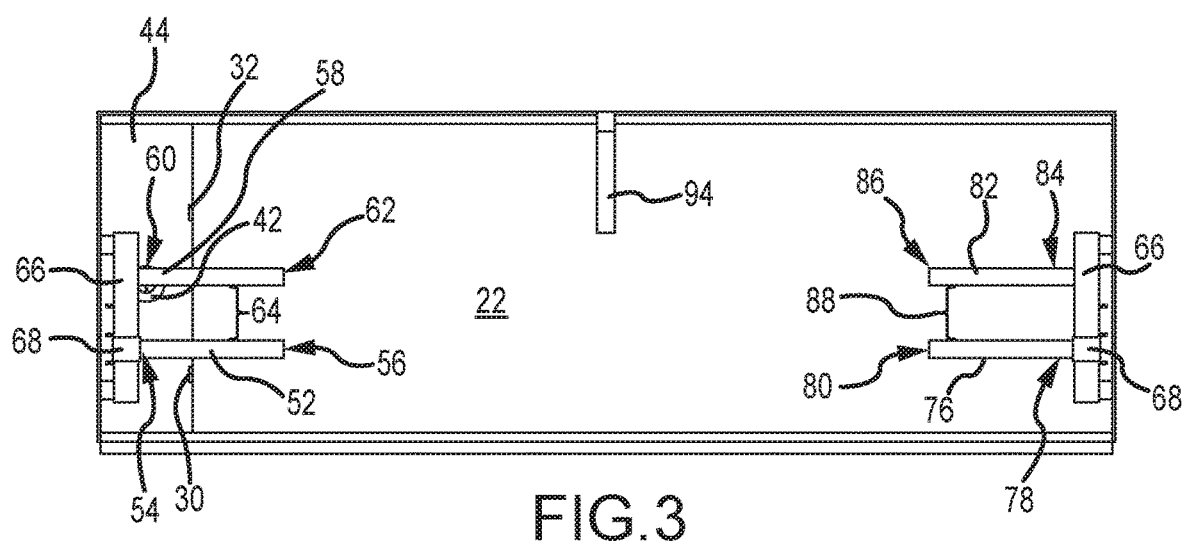
FIG. 3 depicts a top plan view of an embodiment of the washing apparatus of the present technology.
Figure 5:
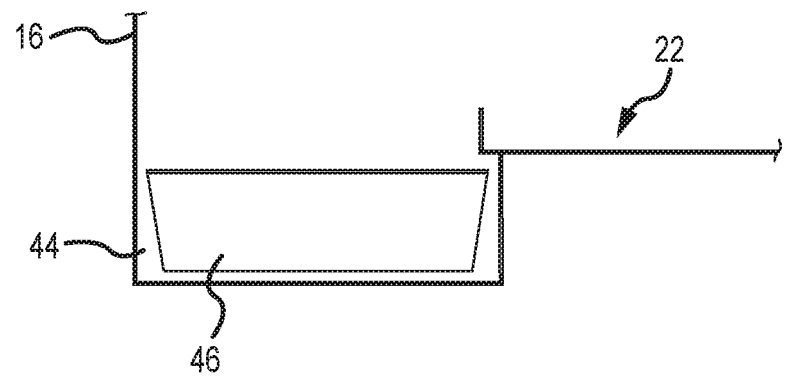
FIG. 5 depicts a partial, cut-away, front elevation view of an embodiment of the washing apparatus of the present technology and depicts one manner in which the trough basket of FIG. 4 may be positioned within a drainage trough of the washing apparatus.

With reference to FIGS. 1 and 2, embodiments of the present technology include a supporting platform 26 that is disposed within the washing container 12 so that the platform 26 is operatively coupled to, but vertically spaced from, the bottom portion 22. In various embodiments, the platform 26 is provided with a generally planar upper surface 28 and a peripheral edge shape that approximates a peripheral edge of the bottom portion 22 of the washing container 12. In particular embodiments, the supporting platform 26 is removably coupled to the bottom portion 22 of the washing container 12 to allow a degree of versatility and the ability to clean or service the supporting platform or washing container 12. In such embodiments, one or more retaining members are provided to prevent the supporting platform 26 from sliding along the bottom portion 22 of the washing container. With reference to FIGS. 2, 3, and 5, one embodiment of the washing apparatus includes a first retainer 30 and second retainer 32 that extend upwardly from the bottom portion 22, adjacent a peripheral edge portion 34 of the supporting platform 26. In other embodiments, the supporting platform is removably fastened to the washing container 12. In some embodiments, the supporting platform 26 is provided with at least one pair of platform legs 40 that extend downwardly from the supporting platform 26 and engage the bottom portion 22 of the washing container 12. It is contemplated that the platform legs 40 could be positioned along the side and/or end portions of the supporting platform 26 as well as being positioned inwardly therefrom. Moreover, the legs 40 can be formed to be removable or height adjustable, to adjust for different heights with respect to the bottom portion 22 of the washing container 12. Various embodiments of the supporting platform 26 may incorporate one or more structures to assist in the drainage of fluid from the upper surface 28 off of the supporting platform 26 during washing operations. For example, with reference to FIGS. 1 and 2, a plurality of openings 38 serve as drain apertures that penetrate the supporting platform 26 such that fluid is allowed to drain freely from the upper surface 28. In other embodiments, it is contemplated that various grooves or channels (not depicted) may be associated with the supporting platform 26 to provide the desired fluid drainage. It is further contemplated that the supporting platform 26 may be provided as a single unit or in a plurality of similarly configured sections that are positioned adjacent to one another.

In various embodiments, the bottom portion 22 of the washing container 12 is positioned at a slight angle from horizontal to direct the washing liquid towards a drain 42. Although the drain 42 is generally shown in the figures to be positioned at one end of the washing apparatus 10, it is contemplated that the location of drain 42 could be placed at virtually any location along bottom portion 22 and that the slope of bottom portion 22 could be adjusted to accommodate any such drain location. The slope of the bottom portion 22 of the container 12 will generally be imitated by the slope of the supporting platform 26, which is operatively coupled thereto.

With reference to FIGS. 1-3 and 5, various embodiments of the washing apparatus 10 include a trough 44 positioned to extend lower than the bottom portion 22. The trough 44 forms a receptacle into which washing liquid flows. Accordingly, in various embodiments, the drain 42 is disposed within, or at least in open fluid communication with, the trough 44. Although the trough 44 is depicted in the figures as being positioned at one end of the washing apparatus 10, it is contemplated that the trough 44, like the drain 42, could be positioned at virtually any location along the bottom portion 22 and the slope of bottom portion 22 adjusted accordingly. Furthermore, although the trough 44 is depicted in the figures as extending across the entire width of the washing apparatus 10, it is contemplated that the length, as well as the width and depth of the trough 44, could be apportioned according to the intended use.

Figure 4:
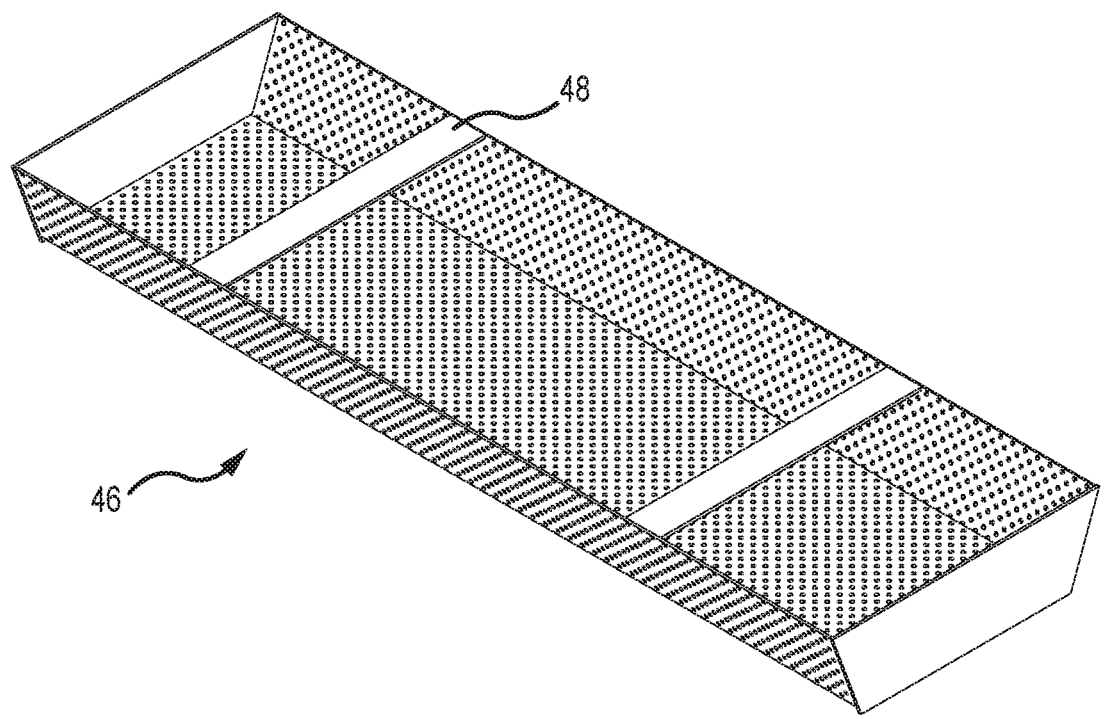
FIG. 4 depicts a perspective view of one embodiment of a trough basket that may be used with various embodiments of the washing apparatus to limit an amount of debris from passing into a drain associated with the washing apparatus.

To limit the amount of dirt and other debris from entering the trough 44 and potentially clogging the drain 42, it is contemplated that a debris basket 46 may be provided in some embodiments of the washing apparatus 10. With reference to FIGS. 2, 4, and 5, embodiments of the debris basket 46 are provided with a shape and size that approximate an opening of the trough 44. In some embodiments, the debris basket 46 is snugly received within the trough 44 to substantially prevent debris from clogging the drain 42. At least one handle member 48 is preferably secured to the debris basket 46 so that the same can be easily removed from the trough 44 for the removal of its contents.

In various embodiments, the washing apparatus 10 may be used to wash and/or maintain bicycles of various sizes and configurations. In such embodiments, it will be advantageous to secure the bicycle in one or more various positions within the washing container so that it remains substantially stationary while it is being washed and/or maintained. In various embodiments, at least one lower support 50 is provided to securely engage a bicycle wheel. With reference to FIGS. 1, 2, 3, and 12, embodiments of the lower support 50 include a first lower support arm 52, having a proximal end portion 54 and a free, distal end portion 56. Embodiments of the lower support 50 further include a second lower support arm 58, having a proximal end portion 60 and a free, distal end portion 62. The second lower support arm 58 is positioned adjacent the first lower support arm 52. In many embodiments, the first lower support arm 52 and second lower support arm 58 are placed in a horizontally spaced-apart relationship with one another, separated by an engagement gap 64 that may be sized and shaped to securely receive a bicycle wheel. The proximal end portion 54 of the first lower support arm 60 and the proximal end portion 60 of the second lower support arm 58 are secured to a lower support base 66. In particular embodiments, the first lower support arm 52 and second lower support arm 58 are oriented in generally horizontal, parallel positions. It is contemplated, however, for particular intended uses, that the first lower support arm 52 and the second lower support arm 58 could be oriented at angles between vertical and horizontal. In embodiments, such as depicted in FIGS. 2 and 3, the lower support base 66 extends from end portion 18 of the washing container 12. In other embodiments, it is contemplated that the lower support base 66 may be supported by other structures associated with the washing container 12, such as the bottom portion 22, trough 44, side portion 14, or side portion 16.

In various embodiments, the proximal end portion 54 of the first lower support arm 52 is movably coupled with the lower support base 66, such that it may be selectively positioned along a length of the lower support base 66. In particular embodiments, the proximal end portion 54 of the first lower support arm 52 is removably coupled to the lower support base 66. In some such embodiments, the proximal end portion 54 includes a bracket 68 that is shaped to removably receive a width of the lower support base 66. A polygonal cross-sectional shape of the lower support base 66 and complementary shaped bracket 68 on the first lower support arm 52 substantially limits relative movement between the first lower support arm 52 and the lower support base 66.

To allow incremental movement of the first lower support arm 52 along a length of the lower support base 66, a plurality of positioning teeth 70 extend outwardly from the lower support base 66, in a spaced-apart relationship with one another along a length of the lower support base 66. Spaces between the positioning teeth 70 are generally sized to approximate a width of the bracket 68. Accordingly, the first lower support arm 52 may be securely positioned with respect to the lower support base 66 in one of various positions that widen or narrow the engagement gap 64. It is contemplated that the various engagement gaps 64 will correspond to a plurality of different bicycle tire and wheel widths. The adjustability of the engagement gap allows the lower support 50 to securely receive tire and wheel widths commonly found on the narrowest of road bicycles to the widest of fat tire bicycles. It is further contemplated, however, that the engagement gap 64 and the lower support 50 could be shaped and sized to secure objects other than bicycle tires and wheels.

Figure 12:
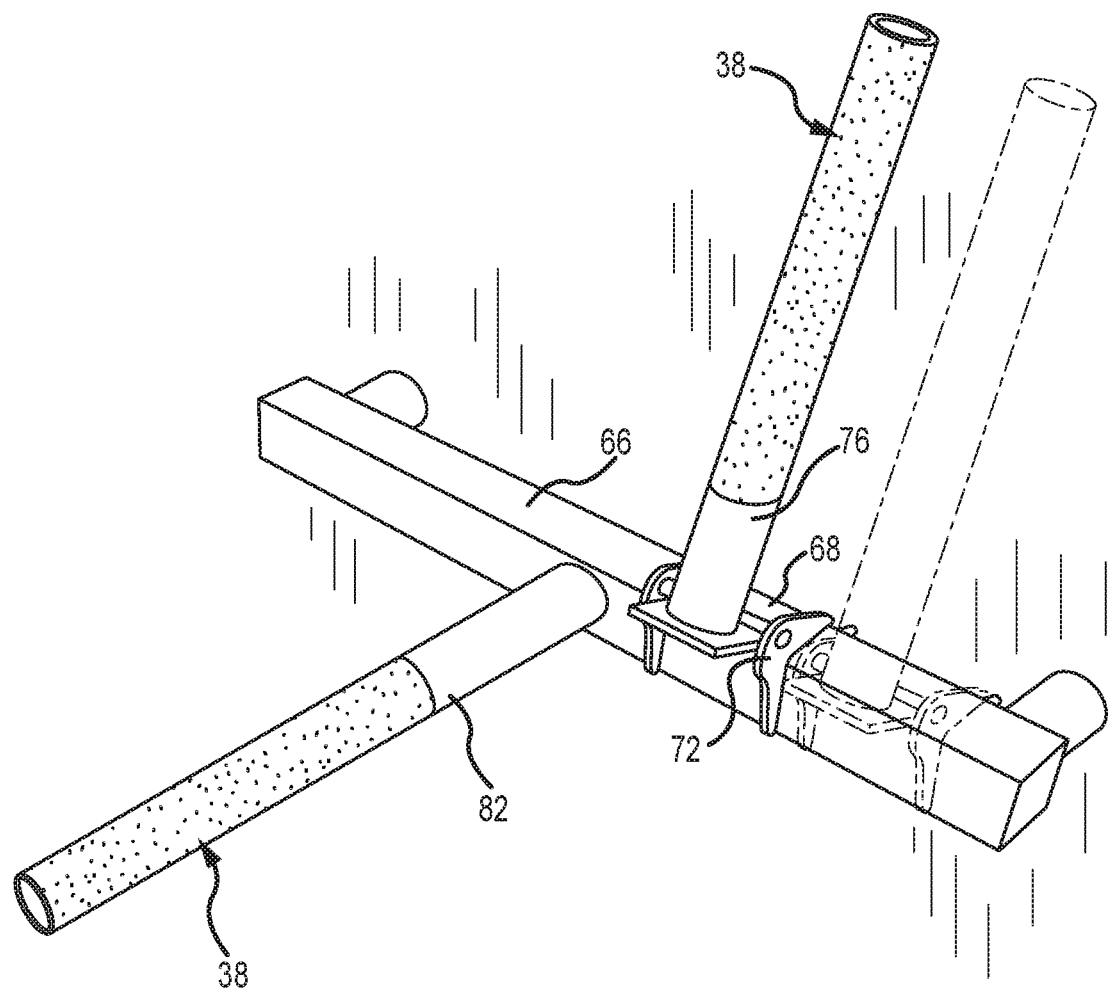
FIG. 12 depicts an isometric view of one embodiment of a lower support member that may be used with various embodiments of the washing apparatus of the present technology and further depicts one manner in which the lower support member may be placed into an open position.

With reference to FIG. 12, the proximal end portion 78 of the first lower support arm 76, in some embodiments, includes a hinge 72. The hinge 72 is configured to allow the first lower support arm 76 to move between a closed position, such as depicted in FIG. 2, and an open position, such as depicted in FIG. 12. With reference to FIG. 2, the closed position places the first lower support arm 76 and second lower support arm 82 closely adjacent opposite sides of the object to be secured. In particular embodiments, the first lower support arm 76 and second lower support arm 82 are positioned to provide a secure, friction-fit engagement with the object. It is contemplated that embodiments of the first lower support arm 76 and second lower support arm 82 will be made to be rigid in order to provide secure engagement with objects disposed within the engagement gap 64. One of various metals, such as stainless steel, provide a rigid and durable nature. However, it may be desirable to form the first lower support arm 76 and second lower support arm 82 from a material, such as various composites and polymers, that are less likely to scratch or otherwise damage the objects being secured within the engagement gap 64. In particular embodiments, such as depicted in FIG. 12, the first lower support arm 76 and second lower support arm 82 may be fit with sleeves 38 constructed of a material, such as various composites, polymers, open or closed-cell foams. In some such embodiments, the material is resiliently deformable, which can combine with a rigid interior first lower support arm 76 and second lower support arm 82 to provide a secure "grip" on the object secured in the engagement gap 64.

The embodiment depicted in FIG. 12 shows the first lower support arm 52 after it has been flipped up into a generally vertical orientation. It is contemplated, however, that the hinge 72 could be configured to allow the first lower support arm 52 to move in a generally horizontal manner, pivoting toward the side portion 14, adjacent an operator's position next to the washing apparatus 10. Depending on the intended use, other angles and directions of articulation are contemplated for the first lower support arm 52. Regardless of the specific orientation, the first lower support arm 52 is substantially moved aside in this "open" position, which clears a path for loading and unloading objects, such as bicycle tires and wheels, into and from the engagement gap 64.

It is contemplated that, in various embodiments, a bicycle or other object can be secured within the washing container 12 with the lone lower support 50. However, some embodiments of the present technology include a second lower support 74 that is configured and operated in a manner similar to lower support 50. In particular, embodiments of the second lower support 74 include a first lower support arm 76, having a proximal end portion 78 and a free, distal end portion 80. Embodiments of the second lower support 74 further include a second lower support arm 82, having a proximal end portion 84 and a free, distal end portion 86. The second lower support arm 82 is positioned adjacent the first lower support arm 76 and, in certain embodiments, the two are placed in a horizontally spaced-apart relationship with one another, separated by an engagement gap 88 that may be sized and shaped to securely receive a bicycle wheel. The proximal end portion 78 of the first lower support arm 76 and the proximal end portion 84 of the second lower support arm 82 are secured to a lower support base 90. The first lower support arm 76 and second lower support arm 82 are oriented in generally horizontal, parallel positions but could be oriented at angles between vertical and horizontal. In embodiments, the lower support base 90 extends from end portion 20 of the washing container 12. In other embodiments it is contemplated that the lower support base 90 may be supported by other structures associated with the washing container 12, such as the bottom portion 22, a trough, side portion 14, or side portion 16. It is further contemplated that the securement of particular objects in various orientations may call for either or both of the lower support 50 and second lower support 74 to be positioned to extend lengths of their lower support arms across a width of the washing container 12, between portions of the side portion 14 and side portion 16. However, positioned across from one another, extending from the end portion 18 and end portion 20, the lower support 50 and second lower support 74 are situated to support the opposing wheels and/or tires of a bicycle. The lengths of the lower support arms associated with the lower support 50 and second lower support 74 define the length of bike that may be simultaneously supported by the lower support 50 and second lower support 74. As the lower support arms increase in length, one is able to secure shorter and shorter bicycles. Accordingly, in some embodiments, the lower support arms associated with the lower support 50 and second lower support 74 may be length adjustable, such as with telescoping lengths, additional arm sections coupled to the distal end portions of the lower support arms, or the like.

With reference to FIGS. 1, 2, 3, and 6-11, embodiments of the washing apparatus 10 will include one or more upper supports 92, each having one or more upper support arms 94. In various embodiments, the upper supports 92 may be positioned to extend from one or more of the side portion 16, end portion 18, or end portion 20. FIGS. 1, 2, and 3 depict an exemplary embodiment of the upper support 92 that extends from an upper support arm 94 in a generally horizontal manner, transversely form the side portion 16 of the washing container 12. In the depicted embodiment, the upper support 92 is removably coupled to an upper edge portion of the side portion 16. In the depicted embodiment, the upper support 92 includes a vertical support 96. A bracket 98 extends from the vertical support 96 and selectively, removably engages the upper edge portion of the side wall 16. The bracket 98 could similarly engage other structures associated with the washing container 12. The bracket could also be permanently or removably mounted to one or more of the side portion 16, end portion 18, or end portion 20, remotely from an edge portion thereof.

Figure 6:
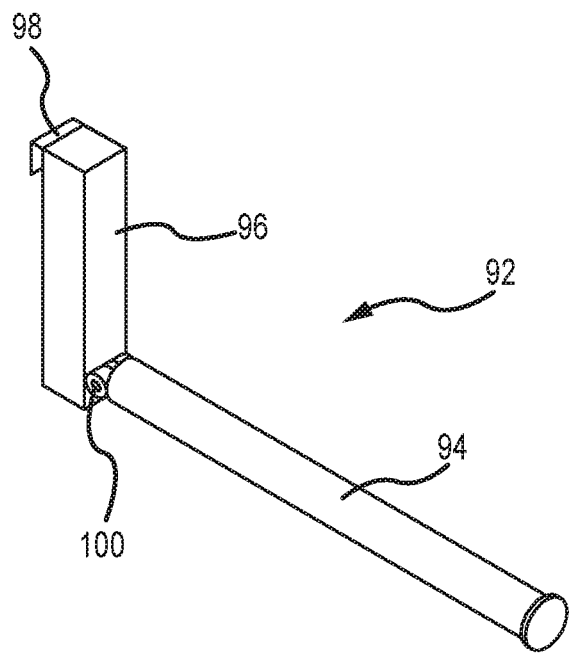
FIG. 6 depicts an isometric view of one embodiment of an upper support member that may be used with various embodiments of the washing apparatus of the present technology.
Figure 7:
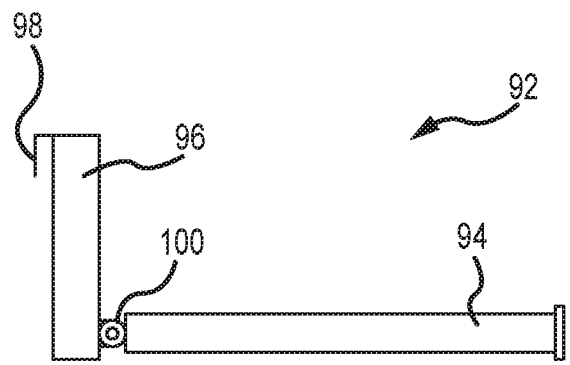
FIG. 7 depicts a side elevation view of the upper support member depicted in FIG. 6.
Figure 8:
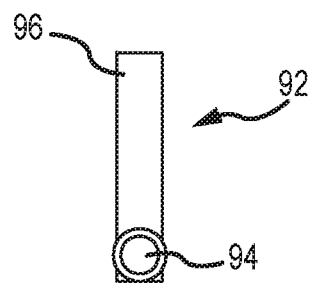
FIG. 8 depicts a front elevation view of the upper support member depicted in FIG. 6.
Figure 9:
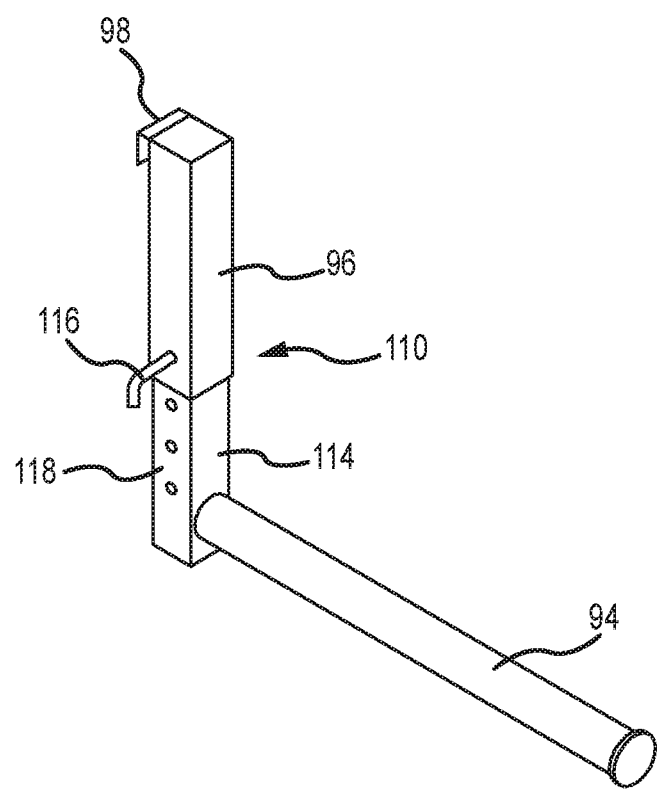
FIG. 9 depicts an isometric view of another embodiment of an adjustable upper support member that may be used with various embodiments of the washing apparatus of the present technology.
Figure 10:
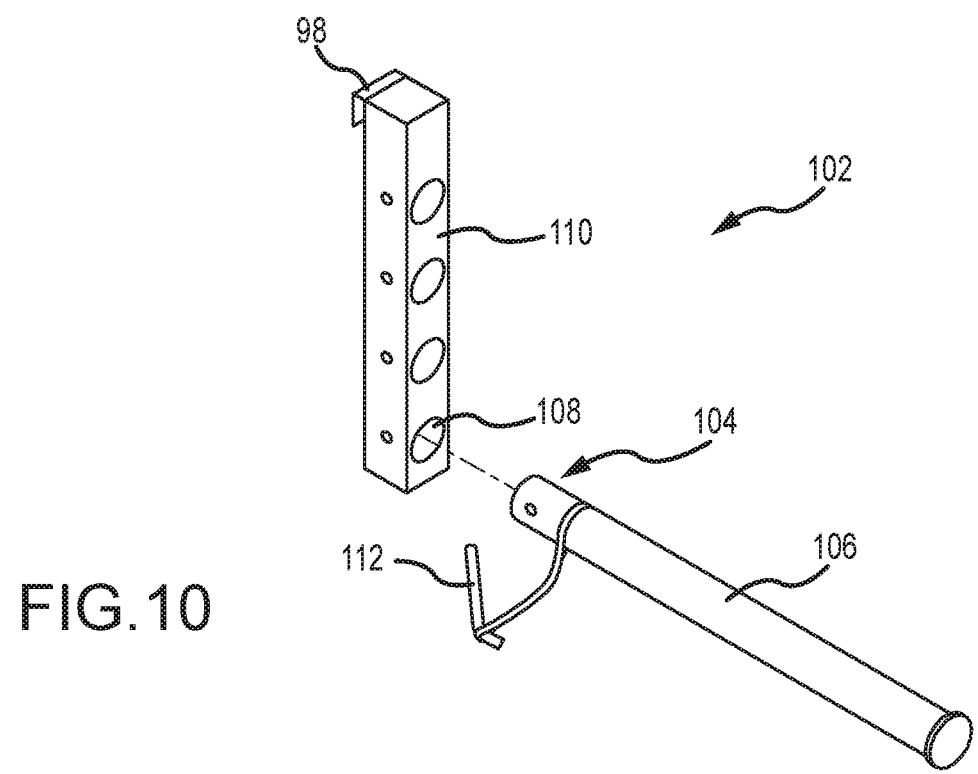
FIG. 10 depicts an isometric view of the upper support member of FIG. 9 in a partially disassembled state.

With reference to FIGS. 6-8, the upper support arm 94 may be coupled with the vertical support 96 with a hinge 100. In such embodiments, the hinge 100 permits the upper support arm 94 to be pivoted from its horizontal use position to a generally vertical storage position. FIG. 10 depicts an upper support 102, where a proximal end portion 104 of an upper support arm 106 may be removably secured within one of a plurality of sockets 108 formed along a length of a vertical support 110. A locking pin 112 may be used to secure the proximal end portion 104 of the upper support arm 102 within a socket 108 of the vertical support 110. In some embodiments, the vertical support 110 may be length adjustable. FIG. 9 depicts one such embodiment wherein a second vertical support telescopes with respect to vertical support 110. A locking pin 116 may be passed through the vertical support 96 and one of a plurality of openings 118 formed along a length of the second vertical support 114.

Figure 11:
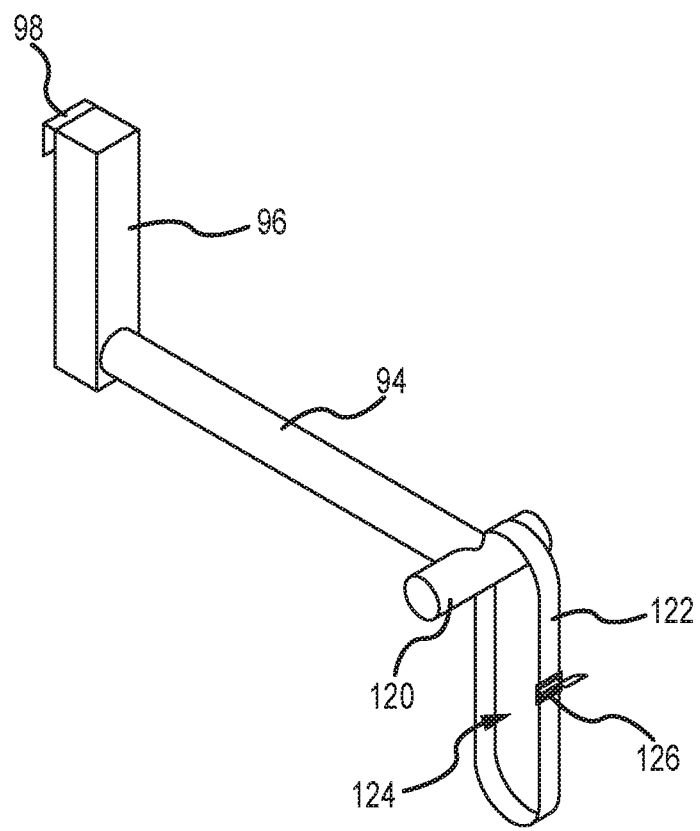
FIG. 11 depicts an isometric view of yet another embodiment of an adjustable upper support member that may be used with various embodiments of the washing apparatus of the present technology.

With reference to FIG. 11, the upper support arm 94 extends from the vertical support 96 in a generally horizontal manner, transversely from the side portion 16 of the washing container 12. However, an alternate support arm 120 is positioned at a distal end portion of the upper support arm 94. The alternate support arm 94 is depicted as a generally elongated arm, having opposite free end portions and a long axis that extends transversely to a length of the upper support arm 94. This configuration permits one or more support straps 122 to depend from an end portion of the alternate support arm. In this position, an opening 124 created by the strap 122 being formed into a closed loop faces the opposite end portions 18 and 20 of the washing container 12. This orientation allows a structural member of an object being secured within the washing container 12 to remain disposed along a long axis of the washing container 12. However, the strap 122 may be positioned to depend from the upper support arm 94 in order to face the opening 124 toward the opposite side portions 14 and 16 of the washing container to provide a structural support in a transverse direction. The strap 122 may include a fastener 126, such as a mechanical buckle, hook and loop fastener, or the like to provide a simple manner for passing portions of the object to be supported into, and from within, the opening 124. It is contemplated that the strap 122 could be provided in a variety of configurations, such as straps, cables, chains, linked members, and the like. Embodiments of the strap 122 may be flexible, rigid, or a combination thereof. The opening 124 may be provided in one or more various shapes and configurations and provided as a closed opening 124 or an open hook-shape. While the alternate support arm 120 is depicted as being an elongate member, it is contemplated that the shape of the alternate support arm 120 could vary according to the intended use of the washing apparatus 10. For example, the alternate support arm 120 could be provided in the form of an open or closeable loop hook. It is also contemplated that the alternate support arm 120 could be removably or permanently secured with the distal end portion of the upper support arm 94.

In various embodiments, the washing apparatus 10 includes a sprayer 128 that is fluidly coupled with a free end of a hose 130. The opposite end of the hose is in fluid communication with a washing fluid source. In some embodiments, the washing fluid source is provided by coupling the washing apparatus with a continuous fluid source, such as the plumbing of a building adjacent to the washing apparatus. Similarly, the drain 42 may be coupled with similarly associated waste plumbing. It is further contemplated that the hose 130 could be coupled with a closed fluid source, such as a washing fluid supply tank having a fluid pump associated therewith to deliver the washing fluid through the hose 130. In this manner, the drain 42 can be placed in fluid connection with such a fluid supply tank and a recirculating pump in order to continuously recirculate the washing fluid. One or more filtering systems may be associated with such a recirculating system, as desired.

In at least one method of use, an object, such as a bicycle is placed within the washing container 12. A portion of the bicycle, such as a wheel or tire, is secured within the engagement gap 64 between the first lower support arm 52 the second lower support arm 58. In some embodiments, a second portion of the bicycle, such as an opposite wheel or tire, is secured within the second engagement gap 88 between a first lower support arm 76 and second lower support arm 82. In such embodiments, the lower support 50 and second lower support 74 are positioned opposite one another such that the engagement gap 64 and second engagement gap 88 face one another. In particular embodiments, the bicycle is secured within the engagement gap 64 between the first lower support arm 52 and the second lower support arm 58 by moving the first lower support arm 52 with respect to the second lower support arm 58 into an open position. In some embodiments, this is achieved by simply flipping the first lower support arm 52 up by means of the hinge 72. The wheel or tire of the bicycle may then be positioned within the engagement gap 64 and the first lower support arm 52 may be moved into its closed position with respect to the second lower support arm 58. In particular embodiments, the engagement gap 64 is selectively narrowed or widened by moving the first lower support arm 52 toward or away from the second lower support arm 58. In some such embodiments, the engagement gap 64 is selectively narrowed or widened by removably coupling the first lower support arm 52 with the lower support base 66 between two of a plurality of positioning teeth 70 that extend from the lower support base 66.

In some embodiments, a portion of the bicycle, such as an upper frame member or bicycle seat may be secured with an upper support arm 94 of an upper support 92 that is operatively coupled to and cantilevers outwardly from one of the opposite end portions 18, 20 and opposite side portions 14, 16 of the washing container 12, above the bottom portion 22. In such a position the drive wheel and sprockets of a bicycle are allowed to turn freely for cleaning or servicing purposes. In various embodiments the bicycle is simultaneously secured by the upper support 92 and the lower support 50. Where an upper support 92 is used, the upper support 92 may be removably positioned along a length of one of the opposite end portions 18, 20 and opposite side portions 14, 16 of the washing container 12, prior to securing the bicycle with the upper support arm 94. In particular embodiments, the upper support arm 94 is selectively positioned at one of a plurality of different heights from the bottom portion 22 of the washing container 12, prior to securing the bicycle with the upper support arm 94, by removably positioning the upper support arm 94 along a length of the vertical support arm 96 of the upper support 92, within one of a plurality of different securement positions. In some embodiment, the bicycle is secured with the support strap 122 that depends from the upper support arm 94.

In various embodiments, the bicycle is supported on the support platform 26, which is operatively coupled with the washing container 12 so that the support platform 26 is vertically spaced from the bottom portion 22 of the washing container 12. As the bicycle is washed, either by hand or with the sprayer 128, the fluid and debris passes to the support platform 26 and through the drainage openings 38 that penetrate the support platform 26. The fluid and debris passes from the support platform 26 to the bottom portion 22 of the washing container 12. The fluid and debris is allowed to collect within the debris basket 46 disposed within the debris trough 44. Once the washing operation is complete, the debris basket 46 is easily removed from the debris trough 44, emptied of debris, and replaced within the debris trough 44 for future use.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An apparatus for washing objects with a liquid, comprising:
   a washing container having opposite end portions, opposite side portions and a bottom portion;
   a lower support cantilevered from a vertical surface of a first opposite end portion of the washing container, such that the lower support is disposed in a spaced relationship above the bottom portion of the washing container; the lower support having a first lower support arm, a second lower support arm extending in a spaced-apart, parallel manner from a support base when in a closed position, each of the first lower support arm and the second lower support arm having a free, distal end portion, to define an open, U-shaped engagement gap, wherein the open, U-shaped engagement gap is defined by the first lower support arm, the second lower support arm, and the support base.

2. The apparatus of claim 1 further comprising:
   a second lower support cantilevered from a second vertical surface of a second opposite end portion of the washing container, such that the second lower support is disposed in a spaced relationship above the bottom portion of the washing container; the second lower support having a third lower support arm, a fourth lower support arm, and a second support base; the third lower support arm and fourth lower support arm extending in a spaced-apart, parallel manner from the second support base, with free, distal ends to define a second open, U-shaped second engagement gap, wherein the second open, U-shaped engagement gap is defined by the third lower support arm, the fourth lower support arm, and the second support base;
   the second lower support being positioned opposite the lower support such that the open, U-shaped engagement gap and second open, U-shaped engagement gap face one another.

3. The apparatus of claim 2 wherein the engagement gap and second engagement gap are shaped and positioned to simultaneously secure opposing tires or wheels of a bicycle within the open, U-shaped engagement gap and the second open, U-shaped engagement gap.

4. The apparatus of claim 1 wherein the first lower support arm is selectively movable with respect to the second lower support arm between the closed position and an open position.

5. The apparatus of claim 4 wherein the first lower support arm and second lower support arm are generally parallel with one another in the closed position and are angularly disposed with respect to one another in the open position.

6. The apparatus of claim 1 wherein the first lower support arm is selectively moveable toward and away from the second lower support arm such that the engagement gap is selectively narrowed or widened by moving the first lower support arm toward or away from the second lower support arm.

7. The apparatus of claim 6 wherein the first lower support arm is operatively coupled with a lower support base such that the first lower support arm is selectively positionable along a length of the lower support base.

8. The apparatus of claim 7 wherein the first lower support arm is removably coupled with the lower support base between two of a plurality of positioning teeth that extend from the lower support base.

9. The apparatus of claim 1 further comprising:
   an upper support having an upper support arm that is operatively coupled to and cantilevers outwardly from one of the opposite end portions and opposite side portions of the washing container, above the bottom portion.

10. The apparatus of claim 9 wherein the upper support arm that is selectively movable between a general horizontal use position and a generally vertical storage position.

11. The apparatus of claim 9 wherein the upper support includes a vertical support that is operatively coupled with one of the opposite end portions and opposite side portions of the washing container, above the bottom portion; the upper support arm being operatively coupled with the vertical support arm.

12. The apparatus of claim 11 wherein the upper support is removably coupled with one of the opposite end portions and opposite side portions of the washing container, such that the upper support may be selectively positioned with respect to portions of the washing container.

13. The apparatus of claim 11 wherein the upper support arm is shaped to be selectively secured with one of a plurality of different securement positions along a length of the vertical support arm.

14. The apparatus of claim 11 wherein the vertical support is selectively length adjustable, such that the upper support arm may be selectively positioned at one of a plurality of different heights from the bottom portion of the washing container.

15. The apparatus of claim 9 further comprising:
a support strap depending from the upper support arm; the support strap being configured to releasably support one or more objects within the washing container.

16. The apparatus of claim 15 wherein the support strap depends from an alternate support arm extending from the upper support arm.

17. The apparatus of claim 1 further comprising:
a support platform operatively coupled with the washing container so that the support platform is vertically spaced from the bottom portion of the washing container; and
a plurality of drainage openings that penetrate the support platform.

18. The apparatus of claim 17 further comprising:
at least one retainer extending upwardly from the bottom portion of the washing container, positioned adjacent a peripheral edge portion of the support platform in a manner that resists horizontal movement of the support platform with respect to the bottom portion of the washing container;
the at least one retainer being shaped to permit fluid to pass from the bottom portion of the washing container beyond the peripheral edge portion.

19. The apparatus of claim 1 further comprising:
a debris trough positioned adjacent the bottom portion of the washing container; the bottom portion of the washing container being angled to allow fluid to flow from the bottom portion of the washing container into the debris trough.

20. The apparatus of claim 19 further comprising:
a debris basket, shaped to closely approximate an interior shape of the debris trough, removably disposed within the debris tough; the debris basket having a plurality of drainage openings that are configured to retain debris but allow fluid to pass through the debris basket into the debris trough.

* * * * *